(12) United States Patent
Takaoka (10) Patent No.: US 11,725,317 B2
(45) Date of Patent: Aug. 15, 2023

(54) THREE-DIMENSIONAL NET-LIKE STRUCTURE

(71) Applicant: C-ENG CO., LTD., Aichi (JP)

(72) Inventor: Yoshihisa Takaoka, Gamagori (JP)

(73) Assignee: C-ENG CO., LTD., Aichi (JP)

( * ) Notice: Subject to any disclaimer, the term of this patent is extended or adjusted under 35 U.S.C. 154(b) by 307 days.

(21) Appl. No.: 17/043,766

(22) PCT Filed: Oct. 25, 2019

(86) PCT No.: PCT/JP2019/041879
§ 371 (c)(1),
(2) Date: Sep. 30, 2020

(87) PCT Pub. No.: WO2020/090648
PCT Pub. Date: May 7, 2020

(65) Prior Publication Data
US 2021/0054549 A1 Feb. 25, 2021

(30) Foreign Application Priority Data

Oct. 30, 2018 (JP) ................................. 2018-203751

(51) Int. Cl.
*D04H 3/14* (2012.01)
*A47G 9/10* (2006.01)
(Continued)

(52) U.S. Cl.
CPC ............. *D04H 3/14* (2013.01); *A47G 9/1009* (2013.01); *A47G 27/0212* (2013.01);
(Continued)

(58) Field of Classification Search
CPC . D04H 3/14; D04H 3/07; D04H 3/045; A47G 9/1009; A47G 27/0212; A61G 7/065; B60N 2/7017
See application file for complete search history.

(56) References Cited

U.S. PATENT DOCUMENTS

| 4,804,577 A | 2/1989 | Hazelton |
| 2002/0041949 A1 | 4/2002 | Nishibori |

(Continued)

FOREIGN PATENT DOCUMENTS

| CN | 101137488 A | 3/2008 |
| CN | 103328711 A | 9/2013 |

(Continued)

OTHER PUBLICATIONS

International Search Report from International Application No. PCT/JP2019/041879 dated Jan. 28, 2020.

*Primary Examiner* — Fredrick C Conley
(74) *Attorney, Agent, or Firm* — Shih IP Law Group, PLLC.

(57) ABSTRACT

A three-dimensional net-like structure is provided that has a soft cushioning property and less variations of hardness and is less expensive.
The three-dimensional net-like structure is made from a thermoplastic resin including a mixture of a polypropylene copolymer (a) and a polypropylene copolymer (b) and has a spring structure formed by bonding continuous filaments partly in random in loops. The polypropylene copolymer (a) has a flexural modulus that is different from a flexural modulus of the polypropylene copolymer (b).

7 Claims, 1 Drawing Sheet

(51) Int. Cl.
 *A47G 27/02* (2006.01)
 *A61G 7/065* (2006.01)
 *B60N 2/70* (2006.01)
 *D04H 3/07* (2012.01)

(52) U.S. Cl.
 CPC .......... *A61G 7/065* (2013.01); *B60N 2/7017* (2013.01); *D04H 3/07* (2013.01); *D10B 2321/022* (2013.01)

(56) References Cited

U.S. PATENT DOCUMENTS

| | | | |
|---|---|---|---|
| 2003/0083437 A1 | 5/2003 | Bugada | |
| 2005/0130544 A1 | 6/2005 | Cheng | |
| 2006/0198983 A1* | 9/2006 | Patel | D04H 3/14 428/92 |
| 2008/0254261 A1 | 10/2008 | Tamada | |
| 2013/0189472 A1 | 7/2013 | Takaoka | |
| 2014/0127460 A1* | 5/2014 | Xu | D04H 1/54 428/141 |
| 2017/0121876 A1* | 5/2017 | Minami | D04H 3/03 |

FOREIGN PATENT DOCUMENTS

| | | |
|---|---|---|
| JP | 63219617 A | 9/1988 |
| JP | 2002061059 A | 2/2002 |
| JP | 2003535944 A | 12/2003 |
| JP | 5894716 B1 | 3/2016 |
| JP | 2017036386 A | 2/2017 |
| WO | 2016002940 A1 | 1/2016 |
| WO | 2016002941 A1 | 1/2016 |

\* cited by examiner

THREE-DIMENSIONAL NET-LIKE STRUCTURE

TECHNICAL FIELD

The present invention relates to a three-dimensional net-like structure having less variations in hardness that is used for, for example, mattresses and cushions.

BACKGROUND ART

Various techniques have been proposed for a three-dimensional net-like structure formed by conventional extrusion molding to have filaments partly tangled in loops. When used in, for example, the medical field, the three-dimensional net-like structure is required to have heat resistance and chemical resistance in order to withstand high temperature disinfection. Patent Literature 1 and Patent Literature 2 disclose three-dimensional net-like structures that are made from a propylene polymer (a) and a propylene homopolymer (b). The propylene polymer (a) has, as structural units, 51 to 95 mol % of propylene and 5 to 49% of α-olefin with respect to 100 mol % of all the monomers.

CITATION LIST

Patent Literature

Patent Literature 1: WO2016/002940
Patent Literature 2: JP5894716B

SUMMARY OF INVENTION

Technical Problem

The three-dimensional net-like structure disclosed in Patent Literature 1 and Patent Literature 2 can solve problems such as heat resistance to some extent. However, mixing of propylene homopolymer (b) to propylene polymer (a) is difficult, which make it hard to attain uniform mixture and causes variations of the mixing state. This could lead to a problem of easily causing variations in the characteristic of the product, especially in hardness of the structure.

In order to reduce the variations, using a twin-screw extruder in the manufacturing process is contemplated to facilitate mixture of the propylene homopolymer to the propylene polymer. The application of the twin-screw extruder, however, causes a problem of expensive machine and difficulty in maintenance. The twin-screw extruder, having a smaller extruding pressure than a single-screw extruder, tends to cause variations of a mixing state in a width direction when a width of the structure is large, and cause the variations in a thickness direction when a thickness of the structure is large.

An object of the invention is to provide a three-dimensional net-like structure that has soft cushioning property and high stability of hardness, and is easy to manufacture and less expensive.

According to an aspect of the invention, there is provided a three-dimensional net-like structure that is made from a thermoplastic resin including a mixture of a polypropylene copolymer (a) and a polypropylene copolymer (b) and formed by bonding continuous filaments partly at random in loops to have a spring structure. A flexural modulus of the polypropylene copolymer (a) is different from a flexural modulus of the polypropylene copolymer (b).

It is preferable that the polypropylene copolymer (a) has the flexural modulus of 100 to 1600 Mpa, and the polypropylene copolymer (b) has the flexural modulus of 5 to 100 MPa.

It is preferable that the thermoplastic resin includes 10 to 40% by weight of the polypropylene copolymer (a) and 60 to 90% by weight of the polypropylene copolymer (b).

It is preferable that the polypropylene copolymer (a) is a propylene-(α-olefin) copolymer and has an α-olefin content of 3 to 30% by weight.

It is preferable that the polypropylene copolymer (b) is a propylene-(α-olefin) copolymer and has an α-olefin content of 10 to 49% by weight.

It is preferable that the polypropylene copolymer (a) has a MFR of 5 to 35 g/10 min and the polypropylene copolymer (b) has a MFR of 4 to 30 g/10 min.

It is preferable that the three-dimensional net-like structure has a longitudinal direction corresponding to an extruding direction and a lateral direction and a thickness direction perpendicular to the extruding direction, and has a thermal expansion rate of 0 to 8% in the longitudinal direction and the lateral direction before and after a hot-air drying test that is performed at a temperature of 110° C. for 30 minutes.

The three-dimensional net-like structure preferably has a hysteresis loss of 5 to 60%.

It is preferable that the three-dimensional net-like structure is used for cushions, vehicle seats, ship seats, train seats, Japanese floor cushions, pillows, nursing care products, or cushions or mattress for beds. Non-combustible, flame-retardant, antibacterial and deodorant effects may be mixed into materials or added to a surface by post-processing.

The three-dimensional net-like structure preferably has an apparent density of 0.025 $g/cm^3$ to 0.2 $g/cm^3$, a thickness of 5 mm to 500 mm in a single layer or a multiple layer and a filament diameter of 0.1 mm to 1.5 mm.

An ethylene content in the mixture of the polypropylene copolymer (a) and the polypropylene copolymer (b) is preferably 3 to 45% by weight.

It is preferable that the three-dimensional net-like structure has a plurality of surfaces, among which two surface, three surfaces or four surfaces are molded, and is molded to have a profiled shape as appropriate. It is feasible to adjust a hysteresis loss and a dispersion of body pressure by adjusting an apparent density or a filament diameter, a multiple layer of various materials, a mixing ratio or a resin to be used when a prevention of bedsore or soft touch is required.

Advantageous Effects of Invention

The invention provides a three-dimensional net-like structure that has less variations in hardness and a soft cushioning property while maintaining high heat resistance. The polypropylene copolymers as the materials are easily mixed with each other to promote mixing of the materials, which provides the three-dimensional net-like structure that is easy to manufacture and less expensive. The hardness, impact resilience and hysteresis loss of the three-dimensional net-like structure are changed by changing a mixing ratio of the polypropylene copolymer (b). By appropriately adjusting the hardness and resilient property of the three-dimensional net-like structure, for example, in an application to mattresses for medical or nursing care purposes, the natural adjustment function of the human body during sleep is satisfied. This adequately addresses bedsores and enables patients to easily rise from beds. Further, it makes it easier for caregivers to change body positions of patients using less power with the aid of the repulsive forces of the mattresses.

Additionally, the three-dimensional net-like structure has a characteristic of small dimensional change in the longitudinal direction and in the lateral direction before and after a hot-air drying test, and in an application to mattresses, suppresses shrinkage of the mattresses and wrinkles of a cover even in the case of high-temperature sterilization, as well as bedsore due to the wrinkles. This makes heat sterilization of the three-dimensional net-like structure easier and dry of the three-dimensional net-like structure simpler and thus addresses hospital infection, which provides the three-dimensional net-like structure suitable for a cushion material that is required in medial or nursing care fields.

DESCRIPTION OF EMBODIMENTS

The following describes an embodiment of a three-dimensional net-like structure. The three-dimensional net-like structure is formed by tangling a plurality of filaments at random in loops and thermally welding the tangles. The three-dimensional net-like structure is made from a material having a certain filament diameter decrease rate to have a three-dimensional structure of sparse portions of a lower bulk density and dense portions of a higher bulk density arranged alternately in an extruding direction during manufacture.

Various aspects of the three-dimensional net-like structure are envisaged. The three-dimensional net-like structure may have any configuration, for example, a structure having harder edges, a structure including a surface layer and a rear face layer having different thicknesses, a structure including a surface and a rear face having different softness levels by adjustment of a bulk density or a filament diameter, and an internally pierced structure. The hardness may be changed from part to part depending on intention of use.

The apparent density (bulk density) of the three-dimensional-net-like structure of the invention is an important factor to provide the softness and the high resilience and is designed as appropriate. The apparent density is preferably 0.025 g/cm$^3$ to 0.2 g/cm$^3$ and is more preferably 0.04 g/cm$^3$ to 0.09 g/cm$^3$. The apparent density of lower than 0.025 g/cm$^3$ does not maintain the shape, while the apparent density of higher than 0.2 g/cm$^3$ is unsuitable for mattress.

The three-dimensional net-like structures of the invention are three-dimensional spring structures formed by welding randomly looped continuous filaments in the molten state, which have filament diameter (diameter) of 0.3 mm to 1.5 mm and are made from a mixture of polypropylene copolymers. The filaments may be in irregular shape or in hollow shape. The filament diameter is, however, an important factor to provide the soft touch. The excessively small filament diameter does not maintain the hardness required for the cushioning properties, while the excessively large filament diameter provides the too much hardness. The filament diameter is thus to be set in an adequate range.

Preferably, the loops have loop lengths of 3 to 50 mm or especially 5 to 15 mm. According to the purpose, the loops on the surface may be laid down to have a surface layer of high bulk density, or an intermediate layer of high bulk density may be formed, or the surface layer of high bulk density may not be provided.

The thicknesses of the structure are significantly related to the softness and the resilient property and are preferably 5 mm to 500 mm, more preferably 10 to 150 mm and furthermore preferably 30 to 110 mm. In the high-resilient structure having hysteresis loss of lower than 35%, for example, the thickness of less than 5 mm undesirably leads to the low resilience, while the thickness of greater than 500 mm undesirably leads to the excessively high resilience.

In the case of mattress, cushion or the like, the dimensions of the three-dimensional net-like structure may be, for example, 300 to 2000 mm in width, 300 to 2500 mm in length and 30 to 120 mm in height. In the case of pillow, the dimensions of the three-dimensional net-like structure may be, for example, 250 to 500 mm in width, 300 to 800 mm in length and 40 to 120 mm in height. The single structure may be used alone or the structures may be combined or multi-layered on a skin material. The above values are shown for illustrative purposes and not limitative.

The three-dimensional net-like structure is manufactured from a resin including a mixture of a polypropylene copolymer (a) and a polypropylene copolymer (b).

The polypropylene copolymer (a) is a polymer mainly including propylene, and is a copolymer of a propylene and a 2-12C (excluding 3C) α-olefin. Examples of the α-olefin include ethylene, 1-butene, 1-pentene, 1-hexene, 4-methyl-1-pentene, 1-heptene, 1-octene, 1-nonene and 1-decene. In particular, the polypropylene copolymer (a) is preferably a propylene-ethylene copolymer.

The polypropylene copolymer (a) contains, as structural units, typically 51 to 95 mol %, preferably 60 to 90 mol %, more preferably 70 to 80 mol % propylene with respect to 100 mol % of all the monomers. The propylene unit within the range in the propylene resin (a) provides the three-dimensional net-like structure having excellent chemical resistance. The molar ratio of the polymer may be determined on the basis of the charging ratio of monomers in manufacturing the polymer, infrared spectroscopy (IR) or nuclear magnetic resonance spectroscopy (NMR), and shows a molar ratio of a target monomer assuming that the total number of the monomers constituting the polymer is 100 mol.

The polypropylene copolymer (a) contains, as structural units, typically 5 to 49 mol %, preferably 10 to 40 mol %, more preferably 20 to 30 mol % α-olefin with respect to 100% of all the monomers.

The polypropylene copolymer (a) preferably has an α-olefin content of 3 to 30 wt %, and more preferably 3 to 10 wt %.

The polypropylene copolymer (a) may include the α-olefin arranged in a random, block, graft or tapered order. The α-olefin is preferably arranged on the polypropylene copolymer (a) in a random or block order in consideration of the excellent resilience of the polypropylene copolymer (a). The polypropylene copolymer (a) may preferably be an impact copolymer.

The polypropylene copolymer (a) has a molecular weight distribution Mw/Mn of preferably not more than 4.0, more preferably not more than 3.0 and further preferably not more than 2.8, for example, not more than 2.6, and has a typical molecular weight distribution Mw/Mn of not less than 1.01. The polypropylene copolymer (a) has a molecular weight distribution Mw/Mn of preferably 1.01 to 4.0, more preferably 1.1 to 3.0 and further preferably 1.5 to 2.8, for example, 2.0 to 2.6. The molecular weight distribution Mw/Mn within the above range leads to less low-molecular weight components and less volatile components and enables the three-dimensional net-like structure to be less odorous and excellent in chemical resistance. The polypropylene copolymer (a) is preferably polymerized using a metallocene catalyst. The molecular weight distribution Mw/Mn may be adjusted by changing, for example, a type of the metallocene catalyst and a polymerization condition (polymerization temperature, polymerization pressure) upon manufacturing.

A number-average molecular weight Mn and a weight-average molecular weight Mw may be measured using a gel permeation chromatography and calculated on polystyrene basis.

The weight-average molecular weight Mw of the polypropylene copolymer (a) is preferably from 10000 to 1000000, more preferably from 20000 to 800000, further preferably from 30000 to 500000 and further more preferably from 100000 to 400000. The weight-average molecular weight Mw of the polypropylene copolymer (a) within the above range provides excellent tensile properties and compression permanent sets to the three-dimensional net-like structure and enables the three-dimensional net-like structure to have an excellent chemical resistance and a low odor.

A melt flow rate (hereinafter referred to as MFR) of the polypropylene copolymer (a) is typically 0.5 to 60 g/10 min, is preferably 1 to 45 g/10 min, and is more preferably 5 to 35 g/10 min. The MFR within the above range achieves excellent mixing and forming properties.

The MFR may be measured in conformity with JIS K7210 (at 230° C. under a load of 2.16 Kg). The measurement may use a material that is directly formed to have a prescribed dimension.

The polypropylene copolymer (a) preferably has a melting peak temperature (based on DSC) of not less than 110° C. and less than 140° C. The melting peak temperature within the above range is desirable in terms of the heat resistance at high-temperature treatment. Further, a Vicat softening temperature (measured in conformity with JIS K7206) of the polypropylene copolymer (a) is preferably from 80 to 120° C., and is more preferably from 90 to 110° C.

A flexural modulus of the polypropylene copolymer (a) is typically not more than 1600 MPa, is preferably not more than 500 MPa, is more preferably not more than 400 MPa and is further preferably not more than 300 MPa, for example, not more than 200 MPa. The flexural modulus of the polypropylene copolymer (a) is typically not less than 20 MPa, and is preferably not less than 100 MPa.

The flexural modulus may be measured in conformity with JIS K7171:1982.

The polypropylene copolymer (a) preferably has a density of not higher than 0.94 g/cm$^3$. Using the material having the density of higher than 0.94 g/cm$^3$ undesirably provides the hard cushion material. The density is more preferably not higher than 0.935 g/cm$^3$ and is further preferably not higher than 0.91 g/cm$^3$. The lower limit of the density is preferably 0.8 g/cm$^3$ or more, and is more preferably 0.85 g/cm$^3$ or more in terms of maintaining the strength.

The polypropylene copolymer (b) for the three-dimensional net-like structure of the invention is contained for the purpose of improving the softness of the three-dimensional net-like structure. The polypropylene copolymer (b) is a copolymer containing propylene monomer as a main component and preferably is a propylene-(α-olefin) copolymer resin.

The propylene-(α-olefin) copolymer of the polypropylene copolymer (b) may be obtained by copolymerizing a propylene and a 2-20C (excluding 3C) α-olefin. Examples of the α-olefin include ethylene, 1-butene, 1-pentene, 1-hexene, 1-octene, 1-heptene. Especially, a propylene-ethylene copolymer is preferable for the polypropylene copolymer (b).

A density of the propylene-(α-olefin) copolymer of the polypropylene copolymer (b) is preferably 0.82 to 0.93 g/cm$^3$ and is more preferably 0.83 to 0.91 g/cm$^3$.

A Vicat softening temperature (measured in conformity with JIS K7206) of the polypropylene copolymer (b) may not necessarily be high, and temperatures of 40-70° C. do not cause heat resistance problems because the polypropylene copolymer (b) is mixed with the polypropylene copolymer (a) having a higher Vicat softening temperature than the polypropylene copolymer (b).

An ethylene content of the polypropylene copolymer (b) is preferably in a range of approximately 10 to 49 wt %, especially in a range of approximately 11 to 16 wt %. The polypropylene copolymer having the ethylene content of 15 to 16 wt % is especially preferable for imparting softness to the three-dimensional net-like structure. The polypropylene copolymer (b) having the relatively high ethylene content of 15% or 16% enables a low bending elasticity and is preferable particularly for imparting softness to the three-dimensional net-like structure.

A flexural modulus of the polypropylene copolymer (b) is preferably 5 to 100 MPa to ensure the softness of the three-dimensional net-like structure. In particular, the flexural modulus of 5 to 60 MPa is preferable and the flexural modulus of 5 to 20 MPa is more preferable.

The polypropylene copolymer (b) contains, as structural units, typically 15 to 45 mol %, preferably 20 to 40 mol % α-olefin with respect to 100 mol % of all the monomers.

The polypropylene copolymer (b) for the three-dimensional net-like structure of the invention has a MFR of 3 to 60 g/10 min and preferably of 4 to 30 g/10 min.

The polypropylene copolymer (b) is preferably a semicrystalline copolymer that is rich in an amorphous substance. It is known that the performance of the copolymer on the basis of the semicrystallinity depends on the degree of crystallinity. The degree of crystallinity decreases with a decrease of stereoregularity where the material shows more elastic behavior. There are many known methods to control the degree of crystallinity. Examples include introduction of stereoirregularity or introduction of comonomers. The polypropylene copolymer (b) is synthesized based on the principle and is likely to exhibit a high elastic property.

A thermoplastic resin constituting filaments of the three-dimensional net-like structure of the invention may be made from a resin mixture of the polypropylene copolymer (a) and the polypropylene copolymer (b), or may further include other resins. For example, a material that does not mainly include propylene components may be blended or copolymerized. A polyethylene resin (c) may be additionally mixed to the mixture of the polypropylene copolymer (a) and the polypropylene copolymer (b).

In the case that the three-dimensional net-like structure of the invention is formed from the resin including the mixture of the polypropylene copolymer (a) and the polypropylene copolymer (b), the resin preferably contains 10 to 40 wt % of the polypropylene copolymer (a) and 60 to 90 wt % of the polypropylene copolymer (b).

According to an aspect of the invention, hardness, impact resilience and hysteresis loss of the three-dimensional net-like structure is changed by changing a mixing ratio of the polypropylene copolymer (b).

As an example, the three-dimensional net-like structure including 10 to 20 wt % of the polypropylene copolymer (a) and 80 to 90 wt % of the polypropylene copolymer (b) is soft with the impact resilience of 15% and the hysteresis loss of 43%.

As another example, the three-dimensional net-like structure including 30 to 40 wt % of the polypropylene copolymer (a) and 60 to 70 wt % of the polypropylene copolymer (b) is relatively hard with the impact resilience of 28% and the hysteresis loss of 31%. However, even with a low mixing ratio of the polypropylene copolymer (b), the three-dimensional net-like structure of the invention is soft in comparison with the three-dimensional net-like structure that is made from a polyethylene resin.

According to the invention, the polypropylene copolymer (a) and the polypropylene copolymer (b), both being copolymers, especially propylene-($\alpha$-olefin) copolymers, are mixed relatively easily. This dispenses with a twin-screw extruder for enhancing the mixing in the manufacturing process, and enables easy mixing with a single-screw extruder to provide stable products. As a result, the advantage of less variations in the hardness can be obtained.

An ethylene content in the mixture of the polypropylene copolymer (a) and the polypropylene copolymer (b) used for the three-dimensional net-like structure of the invention is preferably not more than 45% by weight. The ethylene content in the mixture not less than 45% by weight increases fluctuations of the contraction and softness by temperature.

When the three-dimensional net-like structure of the invention is made from the polypropylene copolymer (a) and the polypropylene copolymer (b), the thermal expansion rate in the longitudinal direction and the lateral direction before and after the hot-air drying test at 110° C. for 30 minutes is preferably 0 to 8%, and is more preferably 0 to 3%. The thermal expansion rate not lower than 8% before and after the hot-air drying test at 110° C. undesirably causes difficulty in enclosing in a cover or wrinkles to a cover.

When the three-dimensional net-like structure of the invention is made from the polypropylene copolymer (a) and the polypropylene copolymer (b) and additionally the polyethylene thermoplastic resin (c), the thermal expansion rate in the longitudinal and lateral directions before and after the hot-air drying test at 90° C. for 30 minutes is preferably 0 to 8%, and is more preferably 0 to 3%. The thermal expansion rate not lower than 8% before and after the hot-air drying test at 90° C. undesirably causes difficulty in enclosing in a cover or wrinkles to a cover.

In the case where the three-dimensional net-like structure of the invention is used for the cushion material, the resin used, the filament diameter, the loop diameter, the surface layer, the bulk density and the shape should be adequately selected according to the purpose of use and the location used. For example, an adequate material is selected based on the preference of hardness in a country. In the case where the structure is used for a layer, the bulk density should be selected adequately based on whether it is used for a surface layer or an intermediate layer. The three-dimensional net-like structure may be molded with a die to a configuration suitable for the purpose of use to such an extent that does not damage the three-dimensional configuration and used for car seat, airplane seat, ship seat, chair and furniture. In order to satisfy required performances, a plurality of the structure made from same or different materials may be layered, and the structure may be used in combination with a hard cotton cushion material, urethane, latex or non-woven fabric. The material may be treated to have fire retardancy, non-flammability, antibiotic property and color. A single or double layered removable cover that is made from a material suitable for achieving, for example, air permeability or waterproof performance may be designed as appropriate.

The following describes a measurement method and a measurement apparatus of the filament diameter decrease rate of the thermoplastic resin. Capilograph 1D (manufactured by Toyo Seiki Seisaku-Sho, Ltd.) is used for the measurement apparatus of the filament diameter decrease rate when the thermoplastic resin is the mixture of the polypropylene copolymer (a) and the polypropylene copolymer (b). The raw material resin is extruded by applying downward a pressure to a capillary having an inner diameter $D_1$ of 1.0 mm $\phi$ and a length of 10 mm at temperature of 230° C. The filaments of the extruded raw material resin are cooled down by an alcohol. $D_2$ represents a diameter of the filament cut at a cross section. The filament diameter decrease rate is calculated as $D_2/D_1$. The filament diameter decrease rate is measured at each shear rate of the raw material resin.

A measurement method and a measurement apparatus of the filament diameter decrease rate of the thermoplastic resin that has a higher ethylene content are similar to those described above, except that the temperature is 190° C.

The continuous filaments of the thermoplastic resin forming the three-dimensional net-like structure of the invention may be combined with another thermoplastic resin to a composite form in such a range that does not adversely affect the object of the invention. The composite form may be a composite of filaments.

The three-dimensional net-structure of the invention may be adequately selected and multi-layered to satisfy the required performances among various structures, for example, those having different sizes of loops, those having different filament diameters, those having different compositions and those having different densities. Bonding or non-bonding of the cushion is designed according to the application and the relationship to the cover. In the case of the multi-layered structure, the three-dimensional net-like structure with high heat resistance may be placed as a surface layer to increase heat resistance of the surface layer and prevent heat transfer to the three-dimensional net-like structure of the inner layer. The result is that the whole multi-layered structure has preferably increased heat resistant property. A plurality of extruding machines may be used to produce the composite or multi-layered three-dimensional net-like structure.

The three-dimensional net-like structure of the invention may be multi-layered and integrated with wadding layer made of side fabric, cotton, urethane, or non-woven fabric by bonding with heat or ultrasonic wave. The integrally bonded structurer may be used for, for example, a seat cushion. Cotton and non-woven fabric with high durability are preferably used. The non-woven fabric is preferably made by bonding fibers with a binder fiber, or has a straight shape with a support structure.

The following describes one exemplary method of manufacturing the three-dimensional net-like structure of the embodiment, but this manufacturing method is not restrictive. A detailed manufacturing method of the three-dimensional net-like structure is described in Applicant's publications, for example, JP 2001-328153A. In the invention, the raw material including the mixture of the polypropylene copolymer (a) and the polypropylene copolymer (b) is melted at a melt temperature that is higher than the melting point of the material by 10° C. to 20° C. The molten raw material is fed into a die. Under application of a pressure, a plurality of filaments is ejected from a plurality of extrusion holes of the nozzle at the lower end to form a filament assembly according to the array of the plurality of extrusion holes and free-fall.

The internal temperature range of the die may be set to 100 to 400° C., and the extrusion rate may be set to 20 to 200 Kg/hour. The internal pressure of the die may be based on, for example, the ejection pressure of a 75 mm screw and ranges about 0.2 to 25 MPa.

The diameter of the hole of the nozzle in the die corresponds to the filament diameter of the filaments of the three-dimensional net-like structure and is preferably 0.2 to 4.0 mm and more preferably 0.4 to 1.8 mm.

The filaments in the molten state are received by at least a pair of left and right chutes (WO 2012/157289 A) to which water or heated water is supplied and come into contact with one another to be fused, form a three-dimensional net-like structure and reach the water surface. The loop diameter and the filament diameter of the filaments are determined according to the angle of the chutes, the flow of supplied water, the diameter of the extrusion holes, the distances between the nozzle surface, chutes and haul-off conveyors, the melt viscosity of the resin, the diameter and the ejection rate of the extrusion holes. The filament diameter (diameter) is 0.1 to 1.8 mm, and the average diameter (length) of random loops is 5 mm to 50 mm.

The filaments of the filament assembly located on the peripheral longitudinal side faces come into contact with inclined planes of a pair of longitudinal chutes on which water flows. This configuration disturbs the vertically falling trajectory, and the filaments are tangled with adjacent filaments in loops and are slid down on the inclined planes with the flow of water or heated water supplied from a supply pipe. The filaments directly receive the effect of gravity and are tangled along the inclined planes to form loops. A pair of short-length chutes may be provided. An integrally formed chute may be provided.

The water supply ports are provided in the supply pipes that are arranged in the longitudinal direction above the respective longitudinal chutes to supply water or heated water in a temperature range of 10 to 90° C. or preferably 40 to 60° C. to the respective inclined planes. The supply pipes are connected with an upstream water supply source. The heated water may be supplied to the short-length chutes by adjusting the water flows from the supply pipes. A similar supply pipe may be additionally provided above the respective short-length chutes.

The filaments of the filament assembly that do not come into contact with either of the inclined planes of the chutes but fall down pass through the molding opening. The filaments that pass through the vicinity of the lower sides of the inclined planes among the filaments passing through the molding opening come into contact with the filaments slid down on the inclined planes to be tangled in loops. The filaments fall, while disturbance of the falling trajectory by the contact tangling is propagated to adjacent filaments in the center direction in a certain range. The filaments that pass through the center of the molding opening among the filaments passing through the molding opening reach the water surface. The haul-off speed of haul-off machines is lower than the falling speed of the filament assembly. The respective filaments reaching the water surface are bent and are tangled in loops in the vicinity of the water surface. The speed of the haul-off machines is preferably 5 to 40 m/hour. The haul-off machines haul off the filament assembly with endless belts having a caterpillar structure. The embodiment is not limited to the structure but may use other structures including rollers. The haul off machines may form loops of the filaments without using the chutes.

The three-dimensional net-like structure is then hauled off with the pair of the haul-off machines at a haul-off speed that is lower than the falling speed of the assembly and falls down while being cooled in a water tank. The three-dimensional net-like structure is put in an interval that is smaller than the short length of the molding opening and is subjected to a supplemental compression effect. Since the filament assembly is not completely cooled and solidified when the assembly falls down to the location of the endless belts while being submerged in water, the filament assembly is subjected to the compression molding effect by holding the assembly between the haul-off machines. When the filament assembly is hauled off and passed out, the assembly in the molten state is cooled and solidified in water, and the final shape of the assembly is fixed. The assembly is then drawn out from the water tank by holding the assembly with the rollers.

The water level of the water tank is preferably equal to or higher than the height of the lower ends of the inclined planes of the chutes. The water level is set irrespective of the height at which the chutes are placed but is set based on the lower ends of the inclined planes. Part of the haul-off machines may be exposed above the water. The water level is preferably set to 0 to 45 mm from the lower end of the inclined planes, and more preferably set to 1 to 30 mm, and most preferably set to 3 to 22 mm. The water level may be equal to the height of the lower ends of the inclined surfaces. The invention can be implemented at the water level of or above this height. The water level is preferably set in consideration of variations of the water level or levelness of the machine upon manufacturing. Depending on the production conditions, setting the water level to be higher than the lower ends of the inclined surfaces by 3 mm or more generally prevents the water level from being located below the lower ends of the inclined surfaces due to the effect of, for example, water pressure. Depending on the production conditions, setting the water level to be higher than the lower ends of the inclined surfaces by 30 mm or more is, on the other hand, generally inadequate due to the start of solidification of the resin, the poor adhesion of the fibers and the increased surface roughness.

The three-dimensional net-like structure having the cross section in the similar shape to that of the molding opening is drained and is conveyed by rollers to a drying heat treatment tank to be subjected to drying heat treatment with the hot air for annealing. It is preferable to set different haul-off speeds of rollers downstream and upstream of the drying heat treatment tank. For example, the haul-off speed of the rollers placed near to the outlet of the drying heat treatment tank is set to be lower than the haul-off speed of the rollers placed near to the inlet of the drying heat treatment tank. After the drying heat treatment, the three-dimensional net-like structure is cut into a desired length. The three-dimensional net-like structure may alternatively be cut into a desired length prior to the drying heat treatment.

The three-dimensional net-like structure taken out of the water tank and drained is subjected to drying heat treatment and annealing at a drying temperature for a predetermined time duration. In the case of the mixture of the polypropylene copolymer (a) and the polypropylene copolymer (b), the drying temperature is preferably not higher than the melting point of the mixture and is more preferably lower than the melting point by 5 to 50° C.

The annealing process may place the three-dimensional net-like structure taken out of the water tank and drained in a frame in the compressed state, perform heat treatment with the hot air and then release the frame from the three-dimensional net-like structure. In the case of a thermoplastic resin, the drying temperature is preferably not higher than the melting point of the thermoplastic resin as the material and is more preferably lower than the melting point by 10 to 30° C. The annealing may be performed two or more times depending on the annealing temperature where the surface is sticky.

As described above, annealing may be performed in a post process (hereinafter referred to as supplementary annealing) after shape-forming of the three-dimensional net-like structure in the water tank. Annealing may be performed supplementarily during production (hereinafter referred to as during-production annealing) by supplying the heated water to the water tank.

In the case of the mixture of the polypropylene copolymer (a) and the polypropylene copolymer (b), the during-production annealing is preferably performed at a temperature that is lower than the melting point of the mixture by at least 10 to 70° C. or more. In the case of the mixture of the polypropylene copolymer (a), the polypropylene copolymer (b) and the polyethylene resin (c), the temperature is preferably lower than the melting point by 10 to 70° C. or more.

The during-production annealing may supply heated water in the range of 20 to 90° C. (preferably in the range of 20 to 80° C. or more preferably in the range of 25 to 50° C.) to at least one pair of chutes, instead of supplying water of ordinary temperature to the chutes, so as to thermally weld the filaments at random and form random loops while performing annealing. The temperature of heated water is preferably 25 to 70° C. for the mixture of the polypropylene copolymer (a) and the polypropylene copolymer (b), and is 25 to 60° C. for the mixture of the polyethylene resin (c), the polypropylene copolymer (a) and the polypropylene copolymer (b). The heated water may be supplied, for example, by (A) heating water flowed to the chutes, (B) heating the entire water tank, (C) increasing the internal temperature of the chutes formed in a tank-like shape or a combination thereof. The excessively high temperature of the heated water supplied to the chutes is likely to cause the resin to adhere to the chutes. It is thus desirable to control the heated water to an adequate temperature range, for example, 10 to 60° C. The supplementary annealing soaks the three-dimensional net-like structure taken out of the water tank in heated water or causes the three-dimensional net-like structure to pass through the hot air.

The annealing may be single annealing of either supplementary annealing by drying heat treatment or during-production annealing with the heated water in the water tank or the like, may be two-step annealing of supplementary annealing after during-production annealing, or may be two-step annealing of supplementary annealing performed twice. In the last case, the temperature of second supplementary annealing is set to be higher than the temperature of first annealing.

The three-dimensional net-like structure of the invention manufactured by the above manufacturing method has the softness, the high resilience, and the dimensional stability in both the longitudinal direction and the lateral direction. The thermal expansion properties differ in the longitudinal direction and in the lateral direction. According to the analysis of the inventors, the mechanism to provide the elastic properties and the thermal expansion properties or more specifically the anisotropic thermal expansion rates is complicated and is not fully elucidated. It is, however, basically thought that the characteristic variations and fluctuations of the thickness of the filaments differ the forms of tangling in the longitudinal direction and in the lateral direction in the process of free-fall, tangling and cooling of the filaments by adequately controlling the filament diameter decrease rate, the melt viscosity and the MFR of the raw material in the adequate range, extrusion molding from the holes of the nozzle, loop-forming of the filaments, cooling of the filament, supplementary annealing by drying heat treatment, and during-production annealing.

The three-dimensional net-like structure has the thermal expansion properties in the lateral direction and the longitudinal direction according to the filament diameter decrease rate of the raw material, the diameter of the holes of the nozzle, the haul-off speed of the conveyors and annealing as the factors. Depending on the circumstances, the hysteresis loss, the repulsive force, the hardness change or the like may be adjusted by changing the annealing temperature or setting the temperature of, for example, high-temperature hot press in post-processing.

Chemicals may be added to the three-dimensional net-like structure of the invention in a certain range that does not deteriorate the performances in any stage from production of resin to production of a molded product to provide various functions such as deodorizing, antibacterial, odor-eliminating, mildew-proofing, coloring, fragrance, flame retardant, incombustible, moisture-absorbing or moisture-desorbing functions.

The following methods were employed in measurement of the above-mentioned characteristic values and measurement of the characteristic values described in below examples.

(1) Filament Diameter (Mm)

Resin filaments were cut from a center portion of each sample. The thicknesses of the resin filaments were measured five times with a caliper, and the average of five measurement values was specified as the filament diameter with regard to S1 and S2. The temperature was set to 60° C. with annealing and set to 23° C. without annealing.

(2) Sample Thickness and Bulk Density (g/Cm$^3$)

Each sample was cut in the size of 30 cm×30 cm. After being left under no load for 24 hours, the height of the same was measured at four different positions. The average of the four measured values was specified as the sample thickness. The volume of the sample was calculated from the sample thickness, and the bulk density of the sample was calculated by dividing the weight of the sample by the volume.

(3) Average Diameter (Mm) of Random Loops

Each sample was cut in the size of 20 cm×20 cm. With regard to random loops in irregular shapes formed on the surface in the extruding direction, the lengths of the major axes of ten loops were measured. The average value was rounded down to the centimeter and was specified as the average diameter of random loops.

(4) Hardness (N)

Each sample was cut in the size of 30 cm (in length)×30 cm (in width). The test piece was measured in conformity with JIS K 6400-2: 2012 method A. The test temperature was 23° C., and the humidity was 50%.

(5) Impact Resilience (Cm)

Each sample was cut in the size of 30 cm (in length)×30 cm (in width). The test piece was measured in conformity with JIS K 6400-3: 2011. A steel ball of 41.5 mm in diameter and 290 g in weight was used. The drop height was 500 mm. The test temperature was 23° C., and the humidity was 50%.

(6) Hysteresis Loss (%)

Each sample was cut in the size of 30 cm (in length)×30 cm (in width). The test piece was measured in conformity with JIS K 6400-2: 2012 method E.

(7) Thermal Expansion Rate (%) Before and after Hot-Air Drying Test (%)

Each sample was cut in the size of 30 cm (in length)×30 cm (in width). Marking was made at two positions away from each other by 25 cm in the longitudinal direction and two positions away from each other by 25 cm in the lateral direction of the test piece. The marking was made with a pen to be readily recognizable even after the dry heating process. After the marking, the test piece was placed in a hot air drying oven for 30 minutes. The test piece was then taken out of the hot air drying oven and was cooled down at ambient temperature of 22° C. for 30 minutes. After cooling, the marking distances were measured at two different positions in each of the longitudinal direction and the lateral direction. The average values of the respective two positions were specified as longitudinal length after the test and lateral length after the test. A measuring instrument capable of measuring down to 0.01 cm was used for measurement of all the lengths. The thermal expansion rate before and after the hot-air drying test was calculated by (measured length−25)/25×100. The temperature of the hot-air drying test was set to 110° C. for the mixture of the polypropylene copolymer (a) and the polypropylene copolymer (b), and the thermal expansion rate before and after the test was calculated by (measured length−25)/25×100. The temperature of the hot-air drying test was set to 90° C. for the mixture of the polypropylene copolymer (a), the polypropylene copolymer (b) and the polyethylene resin (c).

EXAMPLES

The invention will now be described in more detail with reference to the following examples.

The following polypropylene copolymer (a) and polypropylene copolymer (b) were used as materials.

Polypropylene copolymer (a): propylene-ethylene copolymer (block copolymer)

Ethylene content (weight %): 4%

Melting peak temperature: 117° C.

Vicat softening temperature (measured in conformity with JIS K7206): 95° C.

MFR: 30 g/10 min

Flexural modulus (measured in conformity with JIS K7171 1982): 1380 MPa

Polypropylene copolymer (b): propylene-ethylene copolymer (random copolymer)

Ethylene content (weight %): 15%

Vicat softening temperature (measured in conformity with JIS K7206): 47° C.

MFR: 20 g/10 min

Flexural modulus (measured in conformity with JIS K7171 1982): 12 MPa

Example 1

The above-mentioned polypropylene copolymer (a) and polypropylene copolymer (b) were melt-kneaded at a weight ratio of 25:75 at 210° C. using a single-screw extruder, and the molten material was conveyed into a die heated to 225° C. Filaments of the material were ejected downward from a plurality of extrusion holes of a nozzle in the die with the hole pitch of 10 mm and the nozzle hole diameter of 1.6 mm at an extrusion rate of 70 Kg/h. The lower ends of chutes were placed 190 mm below the nozzle surface and were submerged in water. A pair of stainless steel haul-off conveyors of 105 cm in width were placed parallel to each other across an opening width of 71 mm to be arranged partly above the water surface. The ejected filaments in the molten state were solidified on the chutes with supply of water heated to 20° C. The filaments were brought in contact with one another and were tangled to form loops, while being fused at the points of contact, so as to form a three-dimensional net-like structure. The respective surfaces of the structure in the molten state were placed between the haul-off conveyors and were hauled off into water of 20° C. at the haul-off rate of 5 mm/sec to be solidified and flattened. The three-dimensional net-like structure was cut into a predetermined size and was subjected to annealing in hot water of 60° C. with application of compression force in the extruding direction and the width direction to obtain a three-dimensional net-like structure. The resulting structure was formed in a rectangular sectional shape from filaments of 1.0 mm in diameter and had the flattened surfaces, the bulk specific gravity of 60 kg/m$^3$, the thickness of 80 mm, the width of 890 mm, the thermal expansion rates of 0 to 8% in the longitudinal direction and 0 to 8% in the lateral direction before and after the hot-air drying test at 110° C. for 30 minutes, the hysteresis loss of 32%, the impact resilience of 26 cm and the hardness of 446 N.

Figure 1:
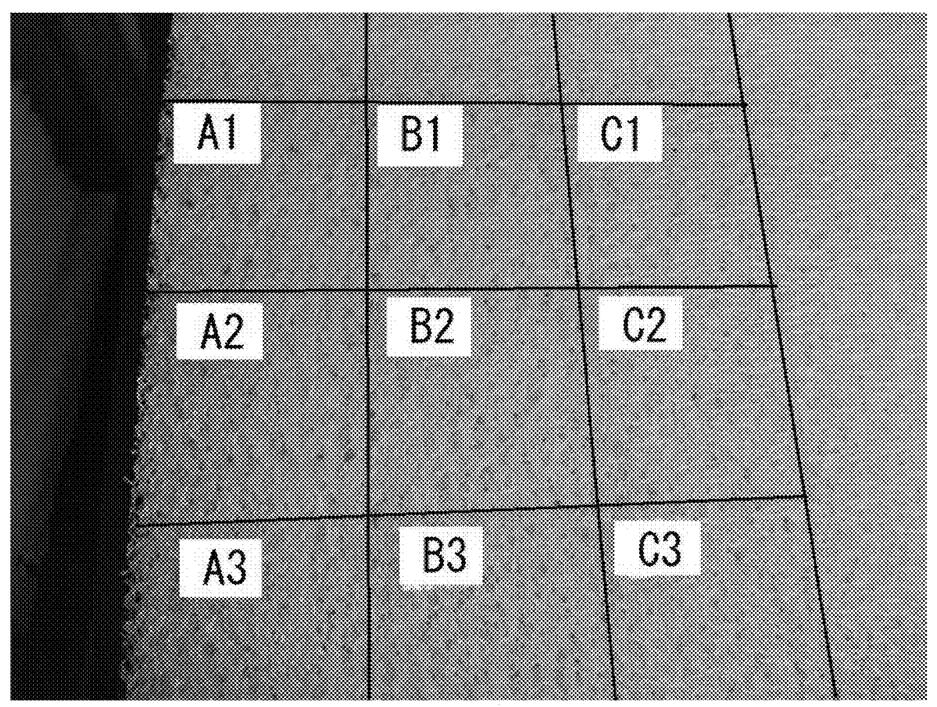
FIG. 1 is a diagram illustrating a sample for measuring variations in hardness of a three-dimensional net-like structure.

Variations in the hardness of the three-dimensional net-like structure obtained in Example 1 were measured in the following manner. The three-dimensional net-like structure 1 was cut at three locations (A, B, C) in the width direction and at three locations (1, 2, 3) in the extrusion direction to obtain nine pieces of samples, and the hardness of each piece was measured. The dimension of each sample is 380 mm in width and 380 mm in the extrusion direction. The maximum values obtained when each sample was compressed by 60 mm in conformity with JIS-K6400-2:2012 method A was specified as the value of the hardness. The measurement was made using Tensilon in Mikawa TextileResearch Center, Zero point was set at 0.3 N measuring point. The compression plate had a diameter of 10 cm and a moving velocity of 100 mm/min. After preliminary compression of 60 mm pushing for three times, the zero point was reset. A variation coefficient was calculated from an average value and standard deviation of the obtained nine data as a value representing the variations. The results are shown in Table 1.

Comparative Example

In the comparative example, the polypropylene copolymer (b) in Example 1, a polypropylene homopolymer (c) and a polypropylene copolymer (d) were used.

Polypropylene homopolymer (c)

MFR: 36 g/10 min

Polypropylene copolymer (d)

Ethylene content: 9%

Vicat softening temperature (measured in conformity with JIS K7206): 77° C.

MFR: 8 g/10 min

Flexural modulus (measured inconformity with JIS K7171 1982): 110° C.

Comparative Example 1

A three-dimensional net-like structure was obtained under the same conditions as those of Example 1 except that the polypropylene copolymer (b), polypropylene homopolymer (c) and the polypropylene copolymer (d) with the polymerization ratio of 30:10:60 by weight were melt-kneaded at 210° C. using the single-screw extruder. The resulting three-dimensional net-like structure was formed in a rectangular sectional shape from filaments of 1.0 mm in diameter and had the flattened surfaces, the bulk specific gravity of 60 kg/m³, the thickness of 80 mm, the width of 890 mm and the hardness of 900 N Variations of hardness of the three-dimensional net-like structured obtained in Comparative Example 1 were also measured in the same manner as Example 1. The results are shown in Table 1.

TABLE 1

|  |  | Hardness (N) | | | Average of hardness[N] | Standard deviation | Variation coefficient(%) |
| --- | --- | --- | --- | --- | --- | --- | --- |
|  |  | A | B | C |  |  |  |
| Example 1 | 1 | 439.9 | 432.7 | 425.4 | 446.1 | 16.7 | 3.8 |
|  | 2 | 451.7 | 464.8 | 452.1 |  |  |  |
|  | 3 | 430.3 | 441.6 | 476.2 |  |  |  |
| Comparative Example 1 | 1 | 1009.3 | 1067.5 | 1067.6 | 900.6 | 170.7 | 19.0 |
|  | 2 | 907.8 | 994.6 | 999.4 |  |  |  |
|  | 3 | 608.7 | 718.0 | 732.4 |  |  |  |

As shown in Table 1, the variation coefficient CV of Example 1 was 3.8%, while the variation coefficient CV of Comparative Example 1 was 19.0%. This shows that the three-dimensional net-like structure of Example 1 had less variations in hardness.

The invention is not limited to the above embodiments but various modifications, substitutions and deletions may be made to the embodiments without departing from the scope of the invention. Such modifications as well as their equivalents, substitutions and deletions are also included in the scope of the invention.

INDUSTRIAL APPLICABILITY

The three-dimensional net-like structure of the invention provides vehicle seats, cushions, mattresses, covers and the like having less variations of hardness and the elastic property fit for health consciousness. In particular, the invention provides cushions that are soft and easy to stretch in the longitudinal direction, which is suitable for care of bedsores and nursing care purposes. Additionally, the invention is applicable to vehicle seats, cushions used for beds, mats and the like or covers for seats.

What is claimed is:

1. A three-dimensional net-like structure that is made from a thermoplastic resin comprising a mixture of a polypropylene copolymer (a) and a polypropylene copolymer (b), wherein:
   the three-dimensional net-like structure has a spring structure formed by bonding continuous filaments partly at random in loops,
   the polypropylene copolymer (a) has a flexural modulus that is different from a flexural modulus of the polypropylene copolymer (b),
   the flexural modulus of the polypropylene copolymer (a) is 100 to 1600 MPa and the flexural modulus of the polypropylene copolymer (b) is 5 to 100 MPa, and
   the thermoplastic resin includes 10 to 40% by weight of the polypropylene copolymer (a) and 60 to 90% by weight of the polypropylene copolymer (b).

2. The three-dimensional net-like structure according to claim 1,
   wherein the polypropylene copolymer (a) has a MFR of 5 to 35 g/10 min and the polypropylene copolymer (b) has a MFR of 4 to 30 g/10 min.

3. The three-dimensional net-like structure according to claim 1,
   wherein the three-dimensional net-like structure is used for cushions, vehicle seats, ship seats, train seats, Japanese floor cushions, pillows, nursing care products, or cushions or mattress for beds.

4. The three-dimensional net-like structure according to claim 1,
   wherein the polypropylene copolymer (a) is a propylene-(α-olefin) copolymer and has an α-olefin content of 3 to 30% by weight.

5. The three-dimensional net-like structure according to claim 1,
   wherein the polypropylene copolymer (b) is a propylene-(α-olefin) copolymer and has an α-olefin content of 10 to 49% by weight.

6. A three-dimensional net-like structure that is made from a thermoplastic resin comprising a mixture of a polypropylene copolymer (a) and a polypropylene copolymer (b), wherein:
   the three-dimensional net-like structure has a spring structure formed by bonding continuous filaments partly at random in loops,
   the polypropylene copolymer (a) has a flexural modulus that is different from a flexural modulus of the polypropylene copolymer (b), and
   the three-dimensional net-like structure has a hysteresis loss of 5 to 60%.

7. A three-dimensional net-like structure that is made from a thermoplastic resin comprising a mixture of a polypropylene copolymer (a) and a polypropylene copolymer (b), wherein:
   the three-dimensional net-like structure has a spring structure formed by bonding continuous filaments partly at random in loops,
   the polypropylene copolymer (a) has a flexural modulus that is different from a flexural modulus of the polypropylene copolymer (b), and
   the three-dimensional net-like structure has a longitudinal direction corresponding to an extrusion direction, a lateral direction and a thickness direction perpendicular to the extrusion direction and has a thermal expansion rates of 0 to 8% in the longitudinal direction and in the lateral direction before and after a hot-air drying test that is performed at a temperature of 110° C. for 30 minutes.

* * * * *